(No Model.)
G. C. HALE.
BRIDLE.
No. 505,762. Patented Sept. 26, 1893.
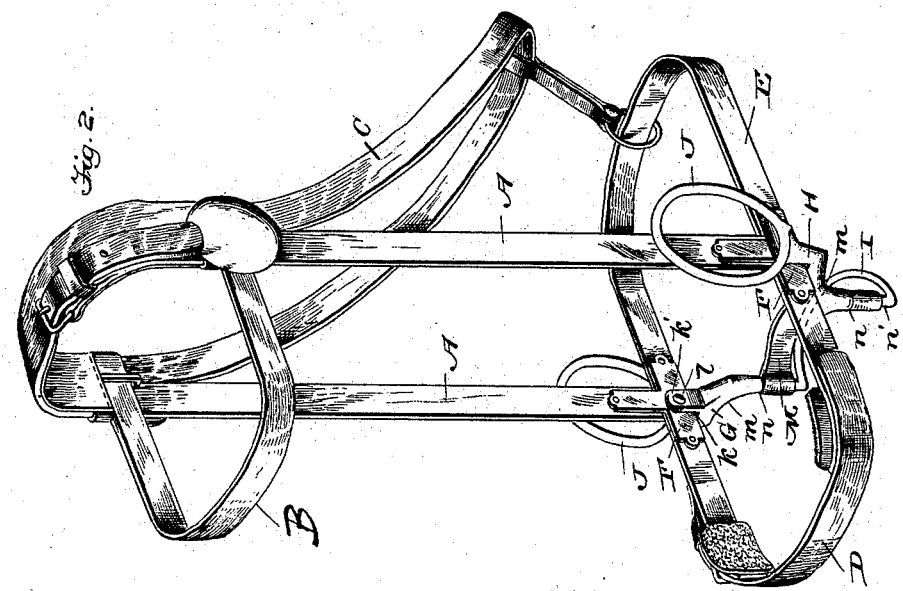
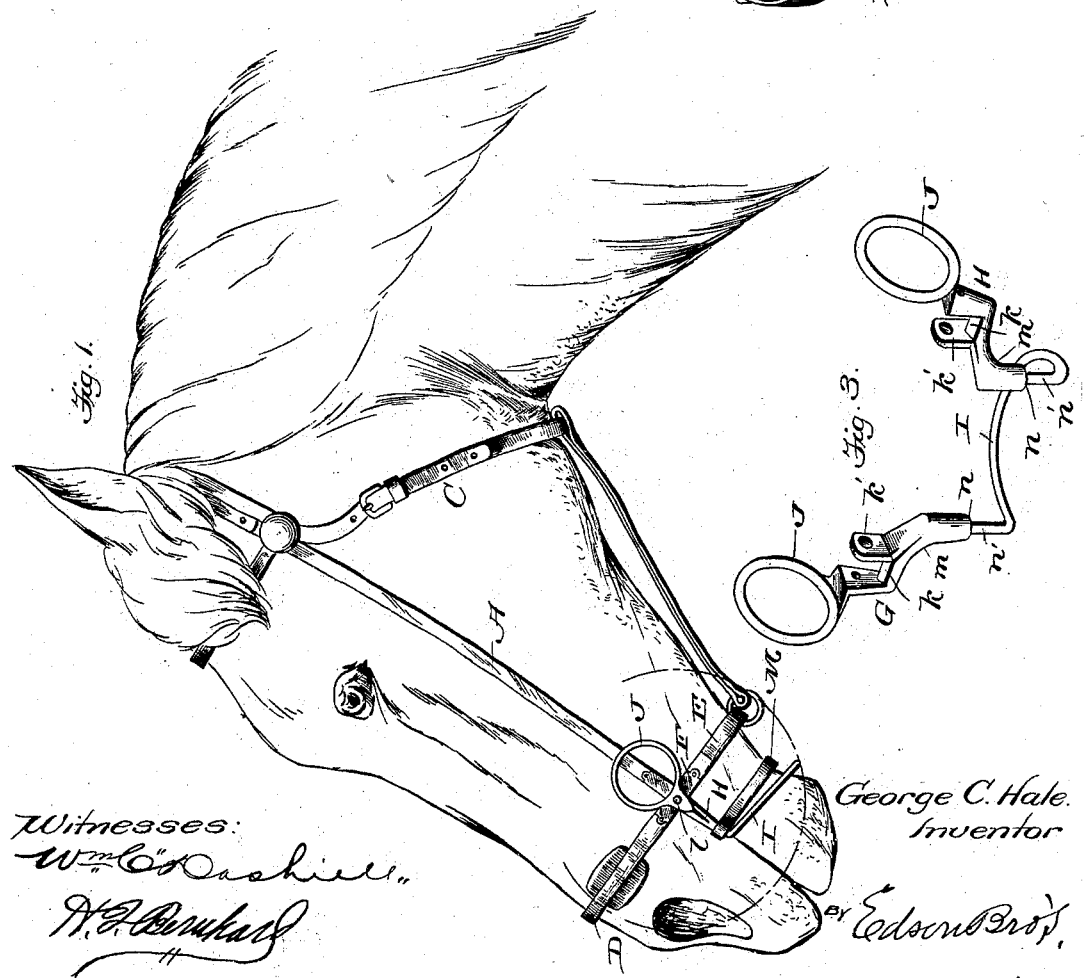
Witnesses:
Wm E Dashiell
W. F. Bernhard
George C. Hale.
Inventor
By Edson Bro's
Att'ys.

UNITED STATES PATENT OFFICE.

GEORGE C. HALE, OF KANSAS CITY, MISSOURI.

BRIDLE.

SPECIFICATION forming part of Letters Patent No. 505,762, dated September 26, 1893.

Application filed May 12, 1893. Serial No. 473,992. (No model.)

*To all whom it may concern:*

Be it known that I, GEORGE C. HALE, a citizen of the United States, residing at Kansas City, in the county of Jackson and State of Missouri, have invented certain new and useful Improvements in Bitless Bridles; and I do hereby declare the following to be a full, clear, and exact description of the invention, such as will enable others skilled in the art to which it appertains to make and use the same.

My invention relates to a bitless bridle of the class shown and described in a prior application for Letters Patent filed by me on the 19th day of January, 1893, Serial No. 458,937; and the object of the present improvement is to simplify the construction and make a bridle of this class more efficient in service as respects the means for guiding the animal and for curbing or checking it when fractious or unruly.

In a bridle designed for use on horses for fire apparatus, patrol wagons, or other vehicles, it is desirable to dispense with the bit that goes in the mouth of the animal so that the bit will not interfere with the horse when eating or drinking and at the same time provision must be made for guiding and controlling the animal without liability of injury to the horse's mouth should it stumble or fall. In my present bridle I combine with the usual headstall and nose band, a pair of side levers which are fulcrumed at points intermediate of their length on said nose band or headstall, and the side levers are provided at their upper ends with means for attachment for the driving lines, and a curb bail rigid with relation to the side levers at the lower ends thereof, so that a pull on the driving lines will turn or move the levers on their fulcra and force the curb bail against the protruding under part of the horse's mouth. This curb bail does not fit in the animal's mouth, but passes beneath or around the under side of the mouth, and said bail normally stands away from and out of contact with the mouth, and to guide the horse I provide an external guide strap that is carried by the side levers in such relation to the curb-bail that it is in contact with the under side of the lower jaw when the bridle is applied to the horse. I construct these side levers in a peculiar way to give the upper ends thereof and the rein-rings sufficient clearance to work freely at the sides of the animal's head while the lower ends of said levers are arranged in such relation to each other as to sustain the curb-bail in position to bear against the protruding under part of the mouth; and the invention further consists in the combination and construction of parts as will be hereinafter more fully described and pointed out in the claims.

I have illustrated the preferred embodiment of my invention in the accompanying drawings, forming a part of this specification, and in which—

Figure 1 is a view of my bitless bridle applied to a horse's head. Fig. 2 is a perspective view of the bridle detached from the horse, and Fig. 3 is a perspective view of the side levers and curb.

Referring by letter to the drawings, in which like letters denote corresponding parts, A, A, designate the usual cheek straps, B is the brow band, and C is the throat latch, all of the usual form and construction.

D is the nose band which is extended to form the strap E that passes around the lower jaw, and the straps D, E, are fastened rigidly to the cheek straps A by means of the rigid metallic plates F, F, which are preferably applied to the inside and outside of the straps A, D, E, and riveted or otherwise securely fastened thereto, to provide a strong and permanent union between the several straps.

G, H, are the two side levers and I is the rigid curb bail, all of which are cast or formed in a single piece of metal for strength and simplicity in construction. The levers G, H, are arranged at opposite sides of the bridle, and each lever is fulcrumed or pivoted at an intermediate point of its length to the metallic union plates F between the straps A, D, E, so that these plates serve the double purpose of forming the union between the straps and for furnishing bearings for the fulcra of the side levers. At the upper ends of the levers are formed the loops or rings J, J, which are preferably cast integral with the levers and which serve as a convenient means for the attachment of the driving lines to the levers G, H, said lines having the usual snap hooks or equivalent means for detachably connecting the lines or reins to the levers.

To enable the levers to be conveniently attached to the union-plates F in a strong manner, I bifurcate or fork each lever at an intermediate point of its length, and thus provide a crotch or recess $k$ therein and the short lug $k'$ alongside of the long arm or main portion of the lever. In this crotch $k$ of each lever is fitted the union plates F, and the short arm $k'$ lies on the inside of the union-plates while the main part of the lever lies outside of the bridle; and through the lug or short arm $k'$, the plates F and the lever passes the screw or shaft $l$ that forms the fulcrum of the lever. Below its fulcrum, each lever is bent or curved inwardly as at $m$, and the lower parts of the levers thus approach each other to sustain the curb bail I in proper position to pass beneath or around the under lip of the animal's mouth, while the upper ends of the levers and the rings or loops J thereon stand away from the straps A of the bridle and the sides of the animal's head to have sufficient clearance for the levers to work freely and easily. The curb bail I stands at an angle or in such relation to the levers, at the lower ends thereof, that the bail fits properly around the under side of the enlarged lower lip of the mouth; and this bail I stands normally away from, or out of contact with, said lower lip of the mouth when the bridle is applied to the horse's head. A guide strap or band M is carried by the levers at points between their fulcra and the curb bail I, and this guide strap M is somewhat shorter than the curb bail I so that it lies somewhat in advance of the bail. This shorter guide strap M above the curb bail is designed to fit or bear against the under side of the lower jaw just above the protruding or enlarged part of the under lip and as this strap fits closely to, and is normally in contact with, the jaw, it serves as the means for guiding the animal in lieu of the bit that goes in the mouth. The guide strap or band is held against vertical displacement in one direction by ribs or shoulders $n, n$, on the levers just above the curb bail, while the bail I serves to prevent displacement in a downward direction of the strap M, the ends of the strap being looped closely around reduced portions $n'$ of the levers between the shoulders $n$ and the curb bail, as shown.

The bridle is fitted on the horse's head so that the guide strap M fits closely to and in contact with the under side of the jaw above the enlarged part of the lower lip while the curb bail stands away from said enlarged part of the lower lip. The driving lines are attached or connected to the loops or rings at the upper ends of the side levers, and by pulling on these lines or reins the driver can easily guide the animal in any direction and curb it when fractious. An easy pull on either of the reins turns the levers on their fulcra and presses the guide band M with sufficient force against the under side of the jaw to guide the animal to the right or left; but when the animal is unruly, a strong pull on the lines turns the levers and presses the curb bail forcibly against the enlarged part of the animal's under lip, as will be readily understood.

From the foregoing it will be seen that I provide a bitless bridle of simple, strong construction which can be worn by the horse at all times without interfering with its eating or drinking and which provides means for properly guiding the animal and for curbing or controlling it.

I am aware that changes in the form and proportion of parts and details of construction of the devices herein shown and described as an embodiment of my invention can be made without departing from the spirit or sacrificing the advantages of my invention, as for instance, the stiff or rigid curb bail I may be dispensed with and the strap or band M employed as the means for guiding and curbing the animal, although I prefer to employ both the curb bail and the strap or band as herein shown and described. I therefore reserve the right to make such modifications and alterations as fairly fall within the scope of my invention.

Having thus fully described my invention, what I claim as new, and desire to secure by Letters Patent, is—

1. In a bridle without a mouth bar, the combination with cheek straps a nose-band and supporting plates, of the levers fulcrumed at intermediate points of their length to said plates and provided with means for attachment of the driving lines, and a curb carried by said levers and lying at an angle thereto, substantially as and for the purposes described.

2. In a bridle, substantially such as described, the combination with cheek pieces a nose-band and supporting plates, of the side levers fulcrumed at intermediate points of their length to said supporting plates and provided at their upper ends with means for attaching the driving lines thereto, and a stiff curb-bail arranged at an angle to said levers and rigid with relation thereto, substantially as and for the purposes described.

3. In a bridle substantially such as described, the combination with cheek straps a nose-band and supporting plates, of the side levers fulcrumed to said supporting plates and carrying a stiff curb bail which lies at an angle to said levers, and a guide band connected to said levers in position to normally press against the animal's jaw, substantially as and for the purposes described.

4. In a bridle, substantially such as described, the combination with cheek straps a nose-band and supporting plates, of the side levers fulcrumed to said plates and provided at their upper ends with means for attachment of the driving lines, a stiff curb bail rigid with the lower ends of said levers and arranged at an angle thereto, and a guide-band carried by the levers between their fulcra and the curb bail and lying in advance of said curb bail, as set forth.

5. In a bitless bridle, the side levers fulcrumed at an intermediate point of their length to the bridle and each lever having its part below the fulcrum bent or curved toward the other lever, the rings or loops at the upper ends of the levers, combined with a nose band a curb-bail rigid with relation to the lower part of the levers, and a guide strap or band carried by the levers, substantially as described.

6. The combination with the cheek-straps and a nose band united together by the union-plates, of the side levers fulcrumed at an intermediate point of their length to said union plates, and provided at one end with a curb bail and at the other ends with means for attachment of the driving lines, and a guide strap carried by the side levers at one side of and in advance of the curb-bail, substantially as described.

In testimony whereof I affix my signature in presence of two witnesses.

GEORGE C. HALE.

Witnesses:
JAMES G. YOUNG,
BESSIE E. YOUNG.